United States Patent

Mitchell et al.

Patent Number: 5,248,440
Date of Patent: Sep. 28, 1993

[54] PAINT SPRAY BOOTH TREATMENT OF WATERBORNE COATINGS

[75] Inventors: David B. Mitchell, Arlington Heights; Thomas P. Curran, Round Lake, both of Ill.

[73] Assignee: W. R. Grace & Co.-Conn., New York, N.Y.

[21] Appl. No.: 828,257

[22] Filed: Jan. 30, 1992

[51] Int. Cl.$^5$ .............................................. C02F 1/56
[52] U.S. Cl. .................................. 210/712; 210/723; 210/728; 210/730; 210/736; 210/930; 252/175; 252/181; 95/195
[58] Field of Search .............. 55/85; 134/38; 210/708, 210/712, 723, 728, 716, 725, 730, 735, 736, 727, 930; 252/175, 181

[56] References Cited

U.S. PATENT DOCUMENTS

| | | | |
|---|---|---|---|
| 2,345,543 | 3/1944 | Wohnsiedler et al. | 260/72 |
| 2,485,079 | 11/1949 | Wohnsiedler et al. | 260/29.4 |
| 2,820,777 | 1/1958 | Suen et al. | 260/89.7 |
| 2,884,395 | 4/1959 | Wohnsiedler | 260/29.4 |
| 3,288,770 | 11/1966 | Butler | 210/735 |
| 3,515,575 | 6/1970 | Arnold | 210/734 |
| 3,718,693 | 2/1973 | Samour et al. | 260/561 A |
| 3,738,945 | 2/1973 | Panzer et al. | 210/734 |
| 3,751,451 | 8/1973 | Samour et al. | 260/485 H |
| 3,780,092 | 12/1973 | Samour et al. | 260/482 R |
| 3,839,419 | 10/1974 | Samour et al. | 260/485 H |
| 3,861,887 | 1/1975 | Forney | 55/19 |
| 3,879,447 | 4/1975 | Samour et al. | 260/482 R |
| 3,898,274 | 8/1975 | Samour et al. | 260/459 |
| 3,925,442 | 12/1975 | Samour | 260/459 |
| 3,928,423 | 12/1975 | Samour et al. | 260/482 P |
| 3,936,492 | 2/1976 | Samour et al. | 260/482 R |
| 3,953,330 | 4/1976 | Tonkyn et al. | 210/736 |
| 3,990,869 | 11/1976 | Forney | 55/19 |
| 3,990,986 | 11/1976 | Gabel et al. | 252/315 |
| 4,002,490 | 1/1977 | Michalski et al. | 134/38 |
| 4,055,495 | 10/1977 | Gabel et al. | 252/327 |
| 4,125,476 | 11/1978 | Dean | 252/115 |
| 4,130,674 | 12/1978 | Roberts et al. | 427/331 |
| 4,185,970 | 1/1980 | Dean | 55/89 |
| 4,440,647 | 4/1984 | Puchalski | 210/712 |
| 4,481,116 | 11/1984 | Cabestany et al. | 210/735 |
| 4,504,395 | 3/1985 | Harpel et al. | 210/712 |
| 4,548,967 | 10/1985 | Brown et al. | 524/56 |
| 4,554,026 | 11/1985 | Cosper et al. | 134/38 |
| 4,558,080 | 12/1985 | Quamme et al. | 524/72 |
| 4,563,199 | 1/1986 | Lindenberger et al. | 55/85 |
| 4,564,464 | 1/1986 | Harpel et al. | 252/181 |
| 4,600,513 | 7/1986 | Mizutani et al. | 210/712 |
| 4,629,572 | 12/1986 | Leitz et al. | 210/714 |

(List continued on next page.)

FOREIGN PATENT DOCUMENTS 2185739 7/1987 United Kingdom .

OTHER PUBLICATIONS

Automotive Coatings, Chemical Week, Jul. 4, 1984, pp. 30-34.

*Primary Examiner*—Peter Hruskoci
*Attorney, Agent, or Firm*—James P. Barr

[57] ABSTRACT

The present invention relates to a novel method for coagulating waterborne paints in paint spray booth recirculating water. The coagulant aid comprises a polynucleate hydroxy silicate-sulphate compound (hereinafter PASS) having the following average composition of the general formula:

$$Al(OH)_B(SO_4)_C(SiO_x)_D(H_2O)_E$$

wherein B ranges from 0.75 to 2.0; C ranges from 0.30 to 1.12; D ranges from 0.005 to 0.1; X is greater than 2.0 but less or equal to 4.0 such that $$3 = B + 2C + 2D(X-2)$$

E is 1.5 to 4 when the product is in solid form; and E is larger than 4 when the product is in aqueous form, which may optionally be used together with alum or a mixture of alum and a polyamine. The coagulant aids of this invention may also be used advantageously with detackifying agents to simultaneously detackify and coagulate solvent based paint particles.

5 Claims, No Drawings

U.S. PATENT DOCUMENTS

| | | | |
|---|---|---|---|
| 4,637,824 | 1/1987 | Pominville | 55/85 |
| 4,656,059 | 4/1987 | Mizuno et al. | 427/345 |
| 4,686,047 | 8/1987 | Arots | 210/712 |
| 4,715,962 | 12/1987 | Bhattacharyya et al. | 210/708 |
| 4,753,738 | 6/1988 | Huang | 210/727 |
| 4,764,561 | 8/1988 | Kiss et al. | 525/165 |
| 4,792,364 | 12/1988 | Huang | 134/38 |
| 4,800,217 | 1/1989 | Kiss et al. | 525/163 |
| 4,853,132 | 8/1989 | Merrell et al. | 210/712 |
| 4,861,491 | 8/1989 | Svensson | 210/691 |
| 4,888,386 | 12/1989 | Huang et al. | 210/734 |
| 4,904,393 | 2/1990 | Mitchell et al. | 210/712 |
| 4,913,825 | 4/1990 | Mitchell | 210/705 |
| 4,981,675 | 1/1991 | Haase et al. | 210/723 |
| 5,116,514 | 5/1992 | Bhattacharyya et al. | 210/734 |
| 5,147,557 | 9/1992 | Purnell | 210/712 |

PAINT SPRAY BOOTH TREATMENT OF WATERBORNE COATINGS

FIELD OF THE INVENTION

This invention relates to the treatment of recirculating water in the aqueous system of paint spray booths and more specifically to the use of certain novel coagulants which comprise polynucleate hydroxy silicate-sulfate compounds, which may optionally be advantageously used in combination with certain other organic detackification compositions.

BACKGROUND OF THE INVENTION

It is estimated that in the automotive and associated coatings industries, approximately 20% to 40% of the total volume of paint sprayed is overspray. The overspray is removed from the paint spray booth by air currents which are scrubbed by recirculating water. The oversprayed paint particles become entrained in the spray booth water which, if untreated, may cause plugging of piping and spray nozzles thus reducing the operating efficiency of the spray booth and increasing the voc emissions. Present paint spray booth detackification treatments are based upon clays (e.g. hectorite or bentonite) amphoteric metals (e.g. sodium zincate) and polymers (e.g. diallyldiamethyl ammonium chloride, melamine aldehydes, etc.) or a combination of these.

While the majority of paints currently used in the market are organic solvent based, in an attempt to lower voc emissions from the painting operation, the use of waterborne coatings is becoming increasingly more common. Waterborne paints are resin suspensions stabilized by a surfactant matrix which upon incorporation into the paint spray booth water disperse and/or emulsify resulting in an increase in both suspended and dissolved solids. These solids must be coagulated and removed from the spray booth water in order to maintain an effective painting operation. These solids do not, however, require detackification as required by organic solvent based paints.

There are, however, some paint spray booth operations wherein both organic solvent based paints and waterborne paints are sprayed into the same booth. Due to major differences in the formulations of waterborne paints and solvent based paints, separate paint detackification agents are necessary to treat the respective paint particles in the spray booth water. Consequently it would represent a major benefit if a single water treating agent could act not only as a coagulant but could also act as a detackifier or optionally if the coagulant could be used in combination with a detackifier without decreasing the performance of the detackifier.

Various aluminum containing compounds have been used as flocculating and coagulating agents in water treatment systems. For example, aluminum sulfate, also known in the trade as alum, has been used extensively as a coagulant in paint spray booth water. However, the use of alum has numerous disadvantages, in particular, it produces a high level of residual, soluble aluminum compounds which require additional treatment prior to discharge. In addition to alum, polyaluminum chloride has been considered for use as a coagulant aid in paint spray booth water. However, this material was found to be ineffective for coagulating water-borne paints. It was therefore surprising and unexpected that another polyaluminum salt was found to effectively coagulate waterborne paints in paint spray booth recirculating water.

SUMMARY OF THE INVENTION

It is an object of this invention to provide an improved coagulant for use in the treatment of paint spray booth water containing waterborne paints.

It is another object of this invention to provide a process wherein a coagulant is added to the treating paint spray booth water to coagulate paint solids contained therein to facilitate their easy removal.

It is another object of this invention to provide a composition useful for treating paint spray booth water to coagulate waterborne paints and detackify organic solvent based paints contained therein.

In accordance with this invention, there has been provided a method of coagulating waterborne paint solids in paint spray booth water comprising adding to the water an effective amount of a polynucleate silicate-sulfate composition to coagulate the solids. The coagulant compositions of this invention may optionally be combined with various other coagulants, coagulant aids and detackifiers.

DETAILED DESCRIPTION

The present invention is directed to a process of coagulating waterborne paints in paint spray booth recirculating water which comprises adding to the water, in an amount effective to coagulate the suspended or dissolved waterborne paint solids contained therein, a polynucleate hydroxy silicate-sulphate composition (hereinafter PASS) wherein the composition has the following general formula:

and wherein B ranges from 0.75 to 2.0; C ranges from 0.30 to 1.12; D ranges from 0.005 to 0.1; X is greater than 2.0 but less or equal to 4.0 such that $$3 = B + 2C + 2D(X-2)$$

E is 1.5 to 4 when the product is in solid form; and E is larger than 4 when the product is in aqueous form. The preparation of the polynucleate hydroxysilicate-sulfate coagulants of the present invention is disclosed in U.S. Pat. No. 4,981,675 which is incorporated herein by reference in its entirety. In general, the preparation of these compositions is a one-step process wherein aluminum sulfate, an alkali silicate and an alkali aluminate are reacted together in an aqueous solution under high shear mixing.

In accordance with the principles of this invention, the PASS may be added to the paint spray booth water in amounts effective to coagulate the suspended or dissolved waterborne paint solids. While the specific dosage amount can vary somewhat, in general, the compositions of this invention are added at a start-up dosage concentration of about 100–500 ppm active, and are preferably added at a concentration of from 250 to 2000 ppm. In general, the pH of the spray booth water should be greater than 7, and is preferably between 8–11.

It has also been discovered that the PASS may be advantageously used in combination with other coagulants and coagulant aids including but not limited to alum, cationic polyamines, sodium aluminate, sodium alginate, cationic aminomethylated tannins, cationic dimethylamine epihalohydrin, cationic polyaluminum chloride, and mixtures thereof. The weight ratios of PASS to coagulant aid is typically 1:99 to 99:1. These combinations are added to the system in the above dosage concentrations.

It has also been surprisingly discovered, that PASS may preferably be used in combination with other known detackifying agents to detackify solvent based paint particles in paint spray booth water. Thus in accordance with the principles of this invention, it is possible to utilize a waterborne paint treatment program in combination with an organic solvent based paint detackification treatment program, where appropriate, to simultaneously coagulate the waterborne paint particles and to detackify the solvent based paint particles, with no negative effects upon the extent of either detackification or coagulation.

Suitable detackifiers for use with the PASS coagulating compositions of this invention include, but are not limited to, melamine aldehydes such as, e.g. melamine formaldehyde, melamine dicyandiamide, or tannin-based polymers (as disclosed in U.S. Pat. No. 4,558,060 which is incorporated herein in its entirety), and the like, and mixtures thereof.

The above detackifiers can be added to the aqueous systems containing both waterborne paint and organic solvent based paint particles at a start-up dosage of about 350 ppm and at a maintenance dosage of from 0.15 to about 0.5 lbs product/lb paint overspray. The waterborne coagulating treatments can be added to the system at a start-up dosage of from 100 to 500 ppm active corresponding to a ratio of detackifier:coagulant of from (0.35 to 1.4):1 While it is preferred to add these treating agents separately, it is possible to pre-blend these compositions in accordance with the foregoing proportions. These proportions are not, per se, critical to the invention, and in general, they may vary greatly depending on the nature of the system being treated. Those of skill in the art can readily determine appropriate dosage amounts using conventional techniques.

Without further elaboration, it is believed that one of ordinary skill in the art, using the foregoing detailed description, can readily utilize the present invention to its fullest extent. The following examples are provided to illustrate the present invention in accordance with the principles of the present invention, but are not to be construed as limiting the invention in any way, except as provided in the appended claims.

Example 1

An initial screening was performed, as indicated in Tables 1-3 wherein several coagulants and coagulant aids were evaluated against two waterborne paint concentrations, 1% and 1.5% w/w respectively. Coagulant aids include polyaluminum chloride and alum; and coagulants include cationic polyamines, starches and tannin. The effectiveness of the coagulants and coagulant aids was qualitatively determined by the appearance of the floc. Thus, a pin floc was categorized as poor whereas a floc of 2-3 mm in diameter was categorized as excellent. Polyaluminum silicate sulfate was used as a control, and as shown in Tables 1 and 2 exhibited enhanced effectiveness at higher paint concentrations.

TABLE 1A

Initial Screening of Coagulant and Coagulant Aids Upon a Blue Waterborne Paint (1% w/w solution in D.I. water)

| Treatment | 250 | 500 | 750 | 1000 | 1250 | 1800 | 1750 |
|---|---|---|---|---|---|---|---|
| PASS | NC | Poor | Poor | Good | Good | Good | Good |
| Alum | Good | Good | Good | Good | Good | Good | Good |
| CS1 | NC | Poor | Poor | Poor | Poor | Good | Good |
| CS2 | NC | Poor | Poor | Poor | Poor | Poor | Poor |
| DMAC | NC | Poor | Poor | Good | Good | Good | Good |
| CS/A | NC | Poor | Poor | POor | Poor | Poor | Good |
| PAC | NC | Excl | Good | Good | Good | Good | Good |

NOTES:
NC = No Change CS1 and CS2 denote quaternary ammonium cationic polysaccharides having charge densities of 3.0 and 1.5 meg/q, respectively, as disclosed in U. S. Pat. No. 4,088,600.
DMAC denotes a water soluble quaternary ammonium polymer as disclosed in U.S. Pat. No. 3,288,770 having an average molecular weight of about 250,000.
CS/A denotes a cationic polysaccharide combination having a charge density of about 2 meg/q.
PAC denotes polyaluminum chloride.

TABLE 1B

Blue Waterborne Paint (1.5% w/w solution in D.I. water)

| Treatment | 500 | 1000 | 1200 | 1400 | 1600 | 1800 | 2000 |
|---|---|---|---|---|---|---|---|
| PASS | Sm Floc | Fair | Excl | Good | Good | Good | Floc |
| ADE | Good | Excl | Good | Good | Good | Good | Floc |
| CS4 | Sm Floc | Poor Floc | Poor Floc | NC | NC | Poor | NC |
| NAA | NC | NC | NC | NC | NC | NC | NC |
| AMT | NC | NC | NC | Poor Floc | Poor Floc | Fair Floc | Fair |
| M/F | NC | NC | NC | NC | NC | NC | NC |
| CH | Poor | Good | Good | Good | Good | Floc | Floc |
| DMAE1 | Poor | Poor | Poor | Poor | Fair | Floc | Floc |

TABLE 1B-continued

| | Blue Waterborne Paint (1.5% w/w solution in D.I. water) | | | | | | |
|---|---|---|---|---|---|---|---|
| Treatment | 500 | 1000 | 1200 | 1400 | 1600 | 1800 | 2000 |
| DMAC2 | Sm | Poor | Poor | Poor | Good | Good | Good |

NOTES:
Floc description/clarity description.
NC = No Change.
ADE denotes a mixture of alum and dimethylamine epichlorohydrin.
CS4 is a cationic polysaccharide combination having a charge density of about 1.5 meq/g.
NAA denotes sodium aluminate.
AMT denotes a cationic tannin-based polymer prepared in accordance with U.S. Pat. No. 4,558,080.
CH = chlorohydrol.
DMAE1 denotes dimethylamine epichlorohydrin having an average molecular weight of about 250,000.
DMAC2 denotes dimethyldiallylammonium chloride having an average molecular weight of about 350,000.

TABLE 2B

| | Yellow Waterborne Paint (1.5% w/w Soln. in D.I. water) | | | | | | |
|---|---|---|---|---|---|---|---|
| Treatment | 500 | 1000 | 1200 | 1400 | 1600 | 1800 | 2000 |
| PASS | Good | Excl | Good | Good | Good | Good | Good |
| ADE | Good | Good | Good | Good | Good | Good | Good |
| CS4 | Poor | Fair | Good | Good | Good | Good | Good |
| NAA | NC | NC | NC | NC | NC | NC | NC |
| AMT | Fair | Fair | Good | Good | Good | Good | Good |
| M/F | NC | NC | Poor | Fair | Poor | Poor | Poor |
| CH | Poor | Poor | Poor | Poor | Poor | NC | NC |
| DMAE | Poor | Poor | Poor | Poor | Poor | NC | NC |
| DMAC2 | Fair | Good | Good | Good | Good | Good | Good |

TABLE 2A

| | Initial Screening of Coagulant and Coagulant Aids Upon a Yellow Waterborne Paint (1% w/w Soln. in D.I. water) | | | | | | |
|---|---|---|---|---|---|---|---|
| Treatment | 250 ppm | 500 ppm | 750 ppm | 1000 ppm | 1250 ppm | 1500 ppm | 2000 ppm |
| PASS | Poor | Excl | Good | Good | Good | Good | Good |
| Alum | Excl | Excl | Good | Good | Good | Good | Good |
| CS1 | Poor | Good | Good | Good | Good | Good | Good |
| CS3 | Poor | Poor | Poor | Good | Good | Good | Good |
| CS6 | Poor | Poor | Poor | Poor | Poor | Good | Good |
| CS7 | Poor | Poor | Poor | Poor | Poor | Good | Good |
| DMAE2 | Poor | Poor | Poor | Poor | Poor | Good | Good |
| DMAC | Good | Good | Good | Good | Good | Good | Good |
| CMS | Poor | Good | Good | Good | Good | Good | Good |
| CMS/A | Poor | Poor | Good | Good | Good | Good | Good |
| PAC | Good | Good | Good | Good | Good | Good | Good |
| DMAE | Poor | Poor | Poor | Poor | Poor | Poor | Poor |
| DMAE2/PAC | Poor | Poor | Poor | Poor | Poor | Poor | Poor |
| DMAE/PAC | Poor | Poor | Poor | Poor | Poor | Poor | Poor |

CS1, CS3, and CS6 denote cationic polysaccharide having charge densities of greater than 3.0 meq/g, 2 to 3 meq/g and less than 1.0 meq/g, respectively.
CS7 is a cationic polysaccharide combination having a charge density of less than 1.0 meq/g.
DMAE2 denotes dimethylamine epichlorohydrin having an average molecular weight of about 60,000.
CMS denotes a cationically modified polysaccharide.
CMS/A denotes a cationically modified polysaccharide combination.
PAC denotes polyaluminum chloride.
DMAE denotes dimethylamine-epichlorohydrin having an average molecular weight between 60,000–300,000.
DMAE(2)/PAC are blends of DMAE(2) and PAC.

TABLE 3

| | Black Waterborne Paint (Account:Modline) (1% w/w Soln. in D.I. water) | | | | | | | |
|---|---|---|---|---|---|---|---|---|
| Treatment | 250 ppm | 500 ppm | 750 ppm | 1000 ppm | 1250 ppm | 1500 ppm | 1750 ppm | 2000 ppm |
| PASS | NC | NC | NC | Good | Good | Good | Good | Good |
| Alum | Good | Good | Good | Good | Good | Good | Good | Good |
| CS1 | NC | NC | Good | Good | Good | Good | Good | Good |
| CS4 | NC | NC | NC | Good | Good | Good | Good | Good |
| DMAC | NC | NC | NC | NC | NC | NC | Good | Good |
| CMS/A | NC | NC | Poor | Good | Good | Good | Good | Good |

TABLE 3-continued

| | Black Waterborne Paint (Account:Modline) (1% w/w Soln. in D.I. water) | | | | | | | |
|---|---|---|---|---|---|---|---|---|
| Treatment | 250 ppm | 500 ppm | 750 ppm | 1000 ppm | 1250 ppm | 1500 ppm | 1750 ppm | 2000 ppm |
| PAC | NC | Good | Good | Good | Good | Good | Good | Good |

Example 2

This example illustrates the effectiveness of combinations of PASS and a mixture of alum, polyamine and hydrochloric acid in water.

TABLE 4

| | Coagulant Combinations for Waterborne Paints (1% w/w Soln. in D.I. water) | | | | | | | |
|---|---|---|---|---|---|---|---|---|
| Treatment | 250 ppm | 500 ppm | 750 ppm | 1000 ppm | 1250 ppm | 1500 ppm | 1750 ppm | 2000 ppm |
| Yellow Waterborne | | | | | | | | |
| PASS/ADE (70, 30) | Excl | Excl | Good | Good | Good | Good | Good | Good |
| PASS/ADE (30, 70) | Excl | Excl | Excl | Excl | Excl | Excl | Excl | Excl |
| PASS/PAC (70, 30) | Poor | Excl | Good | Good | Good | Good | Good | Good |
| PASS/PAC (30, 70) | Excl | Good | Good | Good | Good | Good | Good | Good |
| CS6/PAC (30, 70) | Excl | Good | Good | Good | Good | Good | Good | Good |
| Black Waterborne (Modline) | | | | | | | | |
| PASS/ADE (70, 30) | NC | Good | Good | Good | Good | Good | Good | Good |
| PASS/ADE (30, 70) | NC | Good | Good | Good | Good | Good | Good | Good |
| PASS/PAC (70, 30) | NC | NC | NC | Good | Good | Good | Good | Good |
| PASS/PAC (30, 70) | NC | NC | Good | Good | Good | Good | Good | Good |
| CS6/PAC (30, 70) | NC | NC | NC | Good | Good | Good | Good | Good |
| Blue Waterborne | | | | | | | | |
| PASS/ADE (70, 30) | NC | Excl | Good | Good | Good | Good | Good | Good |
| PASS/ADE (30, 70) | Poor | Excl | Good | Good | Good | Good | Good | Good |
| PASS/PAC (70, 30) | NC | Good | Good | Good | Good | Good | Good | Good |
| PASS/PAC (30, 70) | NC | Good | Good | Good | Good | Good | Good | Good |
| CS6/PAC (30, 70) | NC | Good | Good | Good | Good | Good | Good | Good |

TABLE 5

| | Optimization of Polyaluminum Silicate Sulphate Combinations (1% w/w Soln. in D.I. Water) | | | | | | | |
|---|---|---|---|---|---|---|---|---|
| Treatment | 250 ppm | 500 ppm | 750 ppm | 1000 ppm | 1250 ppm | 1500 ppm | 1750 ppm | 2000 ppm |
| Yellow Waterborne | | | | | | | | |
| Alum/PASS (70, 30) | Good | Good | Good | Good | Good | Good | Good | Good |
| PASS/ADE (70, 30) | Good | Good | Good | Good | Good | Good | Good | Good |
| PASS/ADE (60, 40) | Excl | Excl | Good | Good | Good | Good | Good | Good |
| PASS/ADE (50, 50) | Excl | Good | Good | Good | Good | Good | Good | Good |
| PASS/ADE (40, 60) | Excl | Good | Good | Good | Good | Good | Good | Good |
| PASS/ADE (30, 70) | Excl | Good | Good | Good | Good | Good | Good | Good |
| Blue Waterborne | | | | | | | | |
| Alum/PASS (70, 30) | Poor | Good | Good | Good - | Good | Good | Good | Good |
| PASS/ADE (70, 30) | Poor | Good | Good | Good | Good | Good | Good | Good |
| PASS/ADE (60, 40) | Poor | Good | Good | Good | Good | Good | Good | Good |
| PASS/ADE (50, 50) | Poor | Good | Good | Good | Good | Good | Good | Good |

TABLE 5-continued

| | Optimization of Polyaluminum Silicate Sulphate Combinations (1% w/w Soln. in D.I. Water) | | | | | | | |
|---|---|---|---|---|---|---|---|---|
| Treatment | 250 ppm | 500 ppm | 750 ppm | 1000 ppm | 1250 ppm | 1500 ppm | 1750 ppm | 2000 ppm |
| PASS/ADE (40, 60) | Poor | Good | Good | Good | Good | Good | Good | Good |
| PASS/ADE (30, 70) | Poor | Good | Good | Good | Good | Good | Good | Good |
| | Black Waterborne (General Motors) | | | | | | | |
| Alum/PASS (70, 30) | NC | Good | Good | Good | Good | Good | Good | Good |
| PASS/ADE (70, 30) | Good | Good | Good | Good | Good | Good | Good | Good |
| PASS/ADE (60, 40) | Good | Good | Good | Good | Good | Good | Good | Good |
| PASS/ADE (50, 50) | Good | Good | Good | Good | Good | Good | Good | Good |
| PASS/ADE (40, 60) | Good | Good | Good | Good | Good | Good | Good | Good |
| PASS/ADE (30, 70) | Good | Good | Good | Good | Good | Good | Good | Good |
| | Black Waterborne (Modline) | | | | | | | |
| Alum/PASS (70, 30) | NC | Good | Good | Good | Good | Good | Good | Good |
| PASS/ADE (70, 30) | NC | NC | Good | Good | Good | Good | Good | Good |
| PASS/ADE (60, 40) | NC | NC | Good | Good | Good | Good | Good | Good |
| PASS/ADE (50, 50) | NC | NC | Good | Good | Good | Good | Good | Good |
| PASS/ADE (40, 60) | NC | Good | Good | Good | Good | Good | Good | Good |
| PASS/ADE (30, 70) | NC | Good | Good | Good | Good | Good | Good | Good |
| | Navistar Brown Waterborne (Ohio Rubber) | | | | | | | |
| Alum/PASS (70, 30) | NC | Good | Good | Good | Good | Good | Good | Good |
| PASS/ADE (70, 30) | NC | Good | Good | Good | Good | Good | Good | Good |
| PASS/ADE (60, 40) | NC | Good | Good | Good | Good | Good | Good | Good |
| PASS/ADE (50, 50) | NC | Good | Good | Good | Good | Good | Good | Good |
| PASS/ADE (40, 60) | NC | Good | Good | Good | Good | Good | Good | Good |
| PASS/ADE (30, 70) | NC | Good | Good | Good | Good | Good | Good | Good |

Example 3

The most effective coagulants and coagulant aid combinations of example 2 were rescreened and the supernatant clarity was determined by a spectrophotometer at a wavelength of 490 nm. Table 6 illustrates the relative effectiveness of the combinations upon two waterborne paint samples.

Example 4

This example, as illustrated in Table 7, shows the general ineffectiveness of cationic flocculants as waterborne paint coagulants. As is apparent, these flocculants required in excess of 100 ppm to develop a floc, which would be considered unacceptable from a commercial standpoint.

TABLE 6

| | Supernate Clarity Following Coagulant Screening | | | | | | | | | |
|---|---|---|---|---|---|---|---|---|---|---|
| | | | | Treatments | | | | | | |
| Concentrations | PASS | Alum | PASS/ADE | ADE | PAC | CH | CS1 | CS3 | CS4 | DMAE |
| | (Yellow Waterborne) | | | | | | | | | |
| 250 ppm | 0 | 84 | 92 | 2 | 47 | 0 | 0 | 0 | 0 | 0 |
| 500 ppm | 89 | 86 | 44 | 4 | 0 | 0 | 72 | 0 | 0 | 0 |
| 1000 ppm | 87 | 83 | 50 | 4 | 0 | 0 | 0 | 91 | 94 | 0 |
| 1500 ppm | 73 | 80 | 53 | 8 | 0 | 0 | 0 | 0 | 6 | 0 |
| 2000 ppm | 67 | 91 | 64 | 14 | 0 | 0 | 0 | 0 | 0 | 0 |
| | Black Waterborne (Modline) | | | | | | | | | |
| 250 ppm | 0 | 77 | 0 | 0 | 0 | 0 | 0 | 0 | 0 | 0 |
| 500 ppm | 0 | 75 | 0 | 52 | 0 | 0 | 0 | 0 | 0 | 0 |
| 1000 ppm | 0 | 78 | 64 | 0 | 0 | 0 | 0 | 0 | 0 | 0 |
| 1500 ppm | 39 | 75 | 77 | 0 | 0 | 0 | 0 | 0 | 0 | 0 |
| 2000 ppm | 77 | 73 | 75 | 0 | 0 | 0 | 39 | 0 | 31 | 0 |

TABLE 7

Cationic Flocculant Screening Upon Waterborne Paints
Black Waterborne (General Motors)

| | \multicolumn{7}{c}{Concentration (ppm)} | | | | | | |
|---|---|---|---|---|---|---|---|
| | 25 | 50 | 100 | 150 | 200 | 250 | 300 |
| PAA1 | NC | NC | Good | Good | Good | Good | Good |
| PAA2 | NC | NC | Good | Good | Good | Good | Good |
| PAA3 | NC | NC | Good | Good | Good | Good | Good |
| PAA4 | NC | NC | Good | Good | Good | Good | Good |
| PAA5 | NC | Good | Good | Good | Good | Good | Good |

Summary of Results

All the above flocculants performed poorly upon waterborne paints from Modline (black) and Ohio Rubber (navistar brown). All anionic flocculants performed poorly upon the yellow waterborne paints.

Note:
PAA1 denotes cationic polyacrylamide having high charge, low molecular weight.
PAA2 denotes cationic polyacrylamide having low charge, high molecular weight.
PAA3 denotes cationic polyacrylamide having low charge, high molecular weight.
PAA4 denotes cationic polyacrylamide having high charge, medium molecular weight.
PAA4 denotes cationic polyacrylamide having high charge, high molecular weight.

Example 5

The recirculating system of a paint spray booth was filled with 14 liters of a 10,000 ppm solution of melamine dicyandiamide formaldehyde and deionized water. The pH of the solution was adjusted $\geq 8.5$ and an anionic ($-0.5$ meq/g) polyacrylamide was then added. A pin floc developed as a result of a reaction between the two polymers which quickly sheared providing a solid particle dispersion. The three waterborne treatments (alum, PASS and PASS/ADE) were added separately in three different paint spray booth (P.S.B.) tests (500 ppm). A red and black solvent high solids enamel paint was sprayed (20 ml) and the detackification assessed. None of the waterborne treatments had a negative effect upon the extent of detackification achieved using melamine dicyandiamide formaldehyde and a hydrolyzed polyacrylamide alone.

A yellow waterborne paint was then sprayed in the three separate tests and the paint was coagulated without any negative influence from the solvent paint detackification program.

Therefore, it is possible to utilize a waterborne treatment of either alum or PASS or PASS/ADE with the organic detackification program where appropriate.

We claim:

1. A method of coagulating waterborne paint particles in paint spray booth recirculating water comprising adding to the water, in an amount effective to coagulate the paint particles, a polynucleate hydroxy silicate-sulphate compound (hereinafter PASS) having the following average composition of the general formula:

$$Al(OH)_B(SO_4)_C(SiO_X)_D(H_2O)_E$$

wherein B ranges from 0.75 to 2.0; C ranges from 0.30 to 1.12; D ranges from 0.005 to 0.1; X is greater than 2.0 but less or equal to 4.0 such that $$3 = B + 2C + 2D(X-2)$$

E is 1.5 to 4 when the product is in solid form; and E is larger than 4 when the product is in aqueous form and removing the coagulated paint particles to clarify said water inserted.

2. A method of coagulating waterborne paints according to claim 1 wherein the effective amount is between 100 ppm and 2000 ppm.

3. A method according to claim 1 wherein the PASS is added to the system in combination with a coagulant aid selected from the group consisting of alum, cationic polyamine, polyaluminum chloride, sodium aluminate, sodium alginate, tannins, aminomethylated tannins, cationic dimethylamine epihalohydrins, and mixtures thereof.

4. A method according to claim 3 wherein the weight ratio of PASS to coagulant aid is from 1:99 to 99:1.

5. A method of coagulating waterborne paint particles and detackifying solvent based paint particles in paint spray booth recirculating water comprising adding to the water a polynucleate hydroxy silicate-sulphate compound (hereinafter PASS) having the following average composition of the general formula:

$$Al(OH)_B(SO_4)_C(SiO_X)_D(H_2O)_E$$

wherein B ranges from 0.75 to 2.0; C ranges from 0.30 to 1.12; D ranges from 0.005 to 0.1; X is greater than 2.0 but less or equal to 4.0 such that $$3 = B + 2C + 2D(X-2)$$

E is 1.5 to 4 when the product is in solid form; and E is larger than 4 when the product is in aqueous form together with a detackifying agent in an amount effective to coagulate the waterborne paint and to detackify the solvent based paint particles, respectively and removing the coagulated and de-tackified paint particles to clarify said water.

* * * * *